(12) United States Patent
McClendon

(10) Patent No.: US 10,808,414 B2
(45) Date of Patent: Oct. 20, 2020

(54) COLLAPSIBLE, PORTABLE TOILET FACILITY

(71) Applicant: Lance McClendon, Midlothian, TX (US)

(72) Inventor: Lance McClendon, Midlothian, TX (US)

( * ) Notice: Subject to any disclaimer, the term of this patent is extended or adjusted under 35 U.S.C. 154(b) by 0 days.

(21) Appl. No.: 16/326,803

(22) PCT Filed: Aug. 20, 2016

(86) PCT No.: PCT/US2016/047926
§ 371 (c)(1),
(2) Date: Feb. 20, 2019

(87) PCT Pub. No.: WO2018/038698
PCT Pub. Date: Mar. 1, 2018

(65) Prior Publication Data
US 2019/0194962 A1 Jun. 27, 2019

(51) Int. Cl.
*E04H 1/12* (2006.01)
*A47K 11/02* (2006.01)
*E04B 1/343* (2006.01)

(52) U.S. Cl.
CPC ............... *E04H 1/12* (2013.01); *A47K 11/02* (2013.01); *A47K 11/026* (2013.01); *E04B 1/343* (2013.01); *E04H 1/1216* (2013.01); *Y02A 50/30* (2018.01)

(58) Field of Classification Search
CPC ...................................................... E04H 1/12
USPC ............................................................. 4/476
See application file for complete search history.

(56) References Cited

U.S. PATENT DOCUMENTS

2011/0247132 A1* 10/2011 Watts ..................... B60R 15/04
4/458
2011/0290291 A1* 12/2011 Neal ..................... E04H 1/1244
135/96

* cited by examiner

*Primary Examiner* — Lori L Baker
(74) *Attorney, Agent, or Firm* — Sheri Higgins Law; Sheri Higgins

(57) ABSTRACT

A collapsible, portable toilet facility includes: a back wall; a front frame; at least two side wall frames, wherein the side wall frames are converted between a retracted position and an expanded position, wherein the depth of the side wall frames relative to the back wall is greater in the expanded position compared to the retracted position, wherein each side wall frame comprises two or more side wall members connected to each other at a pivot point, and wherein the side wall members circumvolve around the pivot point during conversion from the retracted position and the expanded position; and at least one of a urinal or a toilet.

20 Claims, 9 Drawing Sheets

COLLAPSIBLE, PORTABLE TOILET FACILITY

TECHNICAL FIELD

Portable toilet facilities are used in settings where indoor toilets are not present or available. Portable toilet facilities can be transported to a desired setting for use by people.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
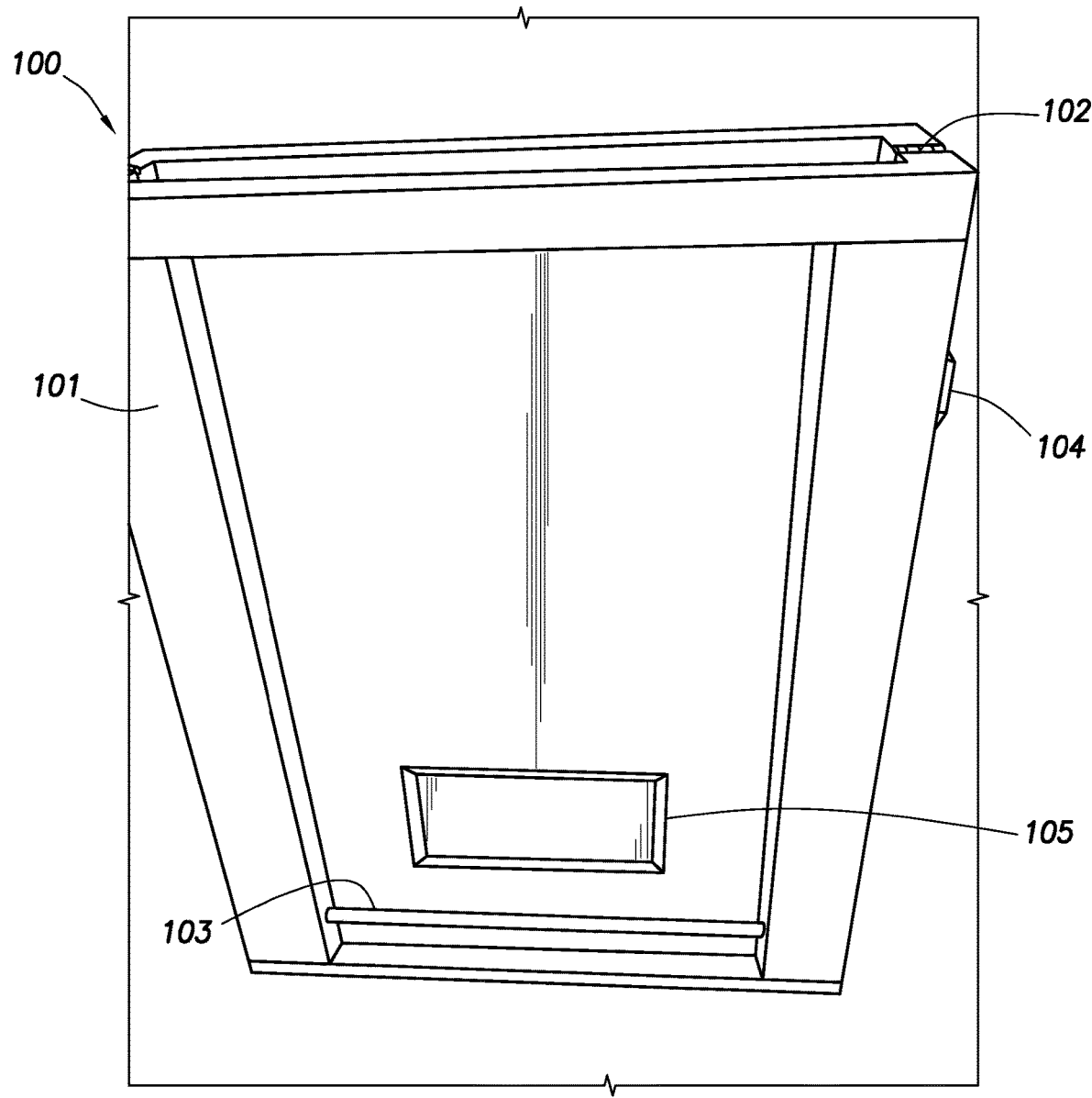
FIG. 1 is a perspective view of a portable toilet facility in a fully collapsed position according to certain embodiments.

It should be understood that, as used herein, "first," "second," "third," etc., are arbitrarily assigned and are merely intended to differentiate between two or more frames, walls, etc., as the case may be, and does not indicate any particular orientation or sequence. Furthermore, it is to be understood that the mere use of the term "first" does not require that there be any "second," and the mere use of the term "second" does not require that there be any "third," etc. It should also be understood that the relative terms, "top," "bottom," "front," "back," and "sides" are used to describe the drawings and various parts to aid the reader in understanding the various embodiments and are intended to be used in relation to the earth's surface. For example, the "top" of a particular part will be located farther away from the earth's surface compared to the "bottom" of the same part or other part.

Many people and industries do not have easy access to permanent toilets. Examples of people include, but are not limited to, campers, backpackers, hikers, hunters, ranchers and farmers, natural disaster victims and volunteers, attendees and workers at outdoor events—such as concerts, festivals, fairs, etc., and workers—such as road workers and oil and gas extraction workers. Examples of industries include, but are not limited to, parks, transportation, military, natural disaster emergency response personnel, police officers—such as border patrol, utility companies, oil and gas exploration and extraction companies, ranching, and farming.

People often rely on portable toilet facilities, when available, to use the bathroom. Portable toilet facilities can be semi-permanently located in a variety of outdoor locations or transported and set up at an outdoor location for temporary use. For example, some outdoor parks may have a portable toilet facility that is rarely moved from the park. By way of another example, a portable toilet facility can be transported to an outdoor location for a specific event, and then after the event is over, the portable toilet facility can be transported to another location or stored for future use. Portable toilet facilities provide people access to a toilet whereas without the portable toilet facility, the people would have to try and find an indoor bathroom or resort to urinating and/or defecating on the ground.

In addition, many people prefer not to use a public toilet—even if the public toilet is a portable toilet. The ability to have a private toilet that is transported and used by an individual person allows a person more flexibility when access to a toilet facility is not available. As such, a private toilet would need to be compact, easy to transport, and easy to setup at a desired location.

Portable toilet facilities are often bulky that makes transportation and storage difficult. For example, a portable toilet facility is generally constructed to be full-size whereby the portable toilet facility has all walls, doors, roofs, etc. installed and a person is capable of walking into the portable toilet facility. The large size of such portable toilet facilities means that a large trailer or vehicle is needed in order to transport the portable toilet facility from one location to another location. Moreover, a transportation trailer or vehicle may require even larger dimensions when attempting to transport more than one portable toilet facility.

In order to overcome the problems associated with a fully constructed and bulky portable toilet facility, other attempts have been made to provide a collapsible or partially assembled portable toilet facility. However, these portable toilet facilities are generally difficult to assemble at a desired location and are not travel-friendly. Additionally, the overall dimensions of these portable toilet facilities in a fully collapsed position are still large, which requires a large trailer or other large vehicle for transporting the portable toilet facility.

It has been discovered that a collapsible, portable toilet facility can be transported in a fully collapsed position and expanded at a desired location for use. The portable toilet facility in the fully collapsed position can be light-weight and have smaller dimensions compared to other collapsible facilities, which allows for easy transport between locations. The portable toilet facility can be expanded in a simple and easy manner at a desired location. The portable toilet facility can then be fully collapsed after use for easy transportation to a new location.

According to certain embodiments, a collapsible, portable toilet facility comprises: a back wall; a front frame; at least two side wall frames, wherein the side wall frames are converted between a retracted position and an expanded position, wherein the depth of the side wall frames relative to the back wall is greater in the expanded position compared to the retracted position, wherein each side wall frame comprises two or more side wall members connected to each other at a pivot point, and wherein the side wall members circumvolve around the pivot point during conversion from the retracted position and the expanded position; and at least one of a urinal or a toilet.

Turning to the figures, FIG. 1 is a perspective view of a portable toilet 100. The portable toilet 100 is shown in a collapsed position. This collapsed position can make it easy to transport the portable toilet 100 from one location to another location. The dimensions of the portable toilet 100 in the collapsed position can range from a height of about 38 inches (in.) (0.97 meter (m)) to about 50 in. (1.27 m), a width of about 30 in. (0.76 m) to about 50 in. (1.27 m), and a depth of about 4 in. (10.2 centimeters (cm)) to about 18 in. (45.7 cm). The portable toilet 100 can have a weight in the range of about 35 pounds (lbs.) (15.9 kilograms (kg)) to about 70 lbs. (31.8 kg). The collapsed position shown in FIG. 1 illustrates the portable toilet 100 for storage and/or transportation prior to assembly at a desired location.

The portable toilet 100 includes a back wall 101. The back wall 101 can include a back wall surface and sides extending from the back wall surface. The thickness of the back wall 101 and the optional sides can be in the range from about 0.25 in. (0.64 cm) to about 2 in. (5 cm). One or more hinges for the back wall 102 can be positioned at or near the sides of the back wall. A support, connecting rod 103 can be connected through the back wall 101 for supporting a side wall frame, and can be located near a bottom and/or top perimeter of the back wall 101. A handle 104 can be located on the outside of the back wall 101. The handle 104 can be used to aid in carrying the portable toilet 100 and/or for assembling the portable toilet at a desired location. A license plate holder 105 can be included to meet transportation regulations when transporting the portable toilet.

Figure 2:
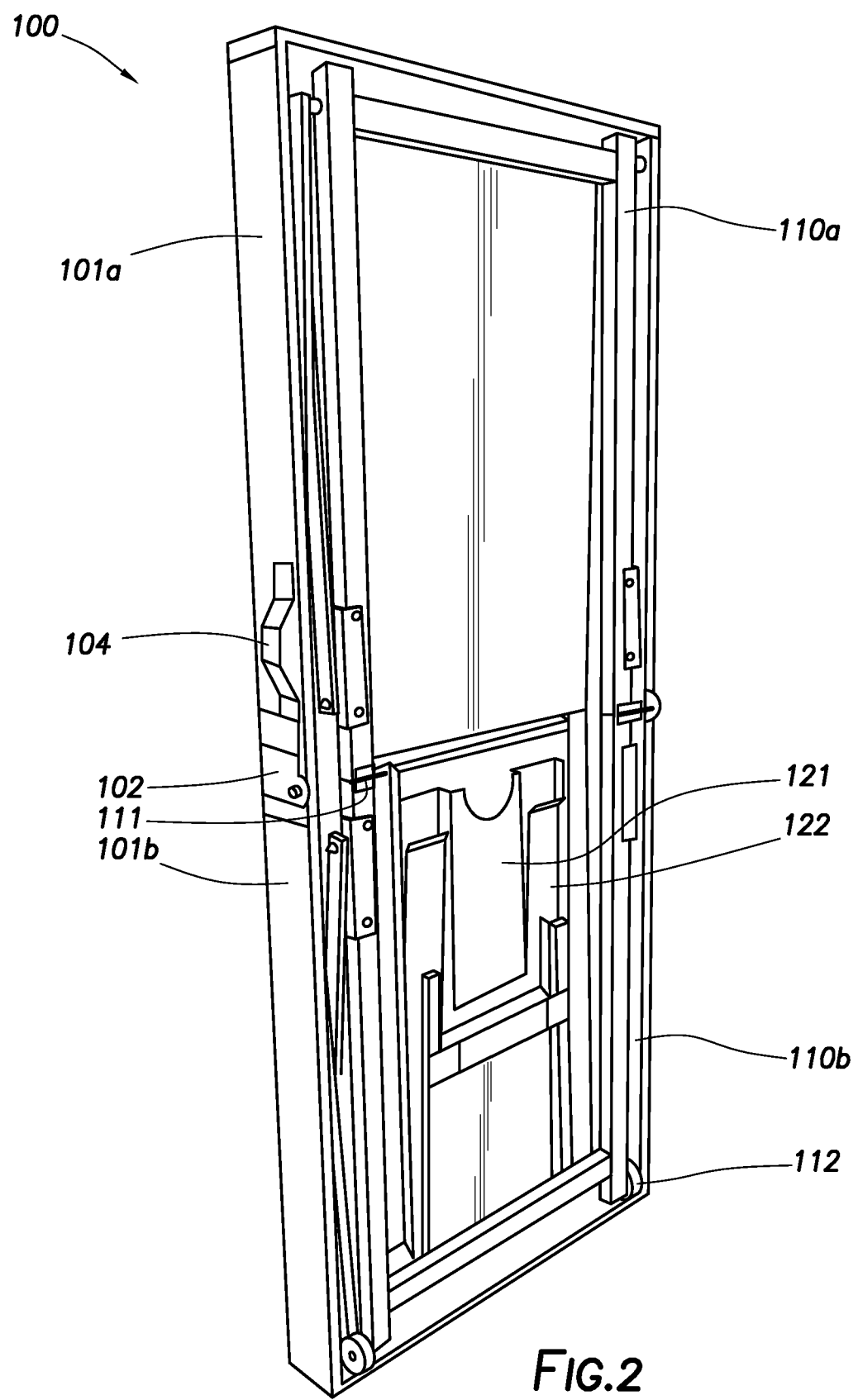
FIG. 2 is a front perspective view of the portable toilet facility in a partially expanded position according to certain embodiments.

FIG. 2 shows the portable toilet 100 in an open position. At least the back wall 101 and a front frame 110 are converted between the collapsed position and the open position, wherein the back wall and front frame have a greater height in the open position compared to the collapsed position. The back wall 101 can opened via the hinge for the back wall 102 to create a first back wall section 101*a* and a second back wall section 101*b*. The back wall can be opened by lifting the first back wall section 101*a* out and away from the second back wall section 101*b* and up. The hinge for the back wall 102 allows the two back wall sections to be opened. The two back wall sections can be positioned on top of each other in the open position. The hinge for the back wall 102 can have a locking device such that the first and second back wall sections 101*a*/101*b* do not collapse after being fully opened. The first and second back wall sections 101*a*/101*b* can also have a mating locking device (not shown) that secures the two back wall sections together prior to opening, for example, during storage and/or transportation of the portable toilet of FIG. 1. This mating locking device can then be unlocked after arrival at a desired location prior to opening the back wall sections.

The portable toilet 100 also includes a front frame 110. The front frame 110 can include a front surface piece, a top piece, a bottom piece, side pieces, and optionally sides extending from the front surface piece and side pieces. The width and depth of the pieces can range from about 0.25 in. (0.64 cm) to about 2 in. (5 cm). The front frame 110 can be located within, flush, or outside the back wall surface or sides extending from the back wall surface of the first and second back wall sections 101*a*/101*b*. A decreased depth of the portable toilet 100 of FIG. 1 may be obtained when the front frame 110 is located within the sides extending from the back wall surface of the first and second back wall sections 101*a*/101*b*. Also shown in FIG. 2 are wheels 112, a hinge for the front frame 111, a urinal 121, and a toilet seat 122.

According to certain embodiments, the back wall 101 and the front frame 110 of the portable toilet 100 include only one piece instead of sections. The portable toilet 100 for storage and/or transportation according to this embodiment can be illustrated according to FIG. 2. According to this embodiment, hinges 102/111 are not necessary because the back wall and front frame are not in sections. The overall dimensions of the back wall 101 (when the front frame is located within the sides of the back wall) or the back wall and front frame 110 can be in the range from a height of about 6.3 feet (ft.) (1.9 m) to about 8.3 ft. (2.5 m), a width of about 30 in. (0.76 m) to about 50 in. (1.27 m), and a depth of about 2 in. (5.1 cm) to about 9 in. (22.9 cm).

Figure 3:
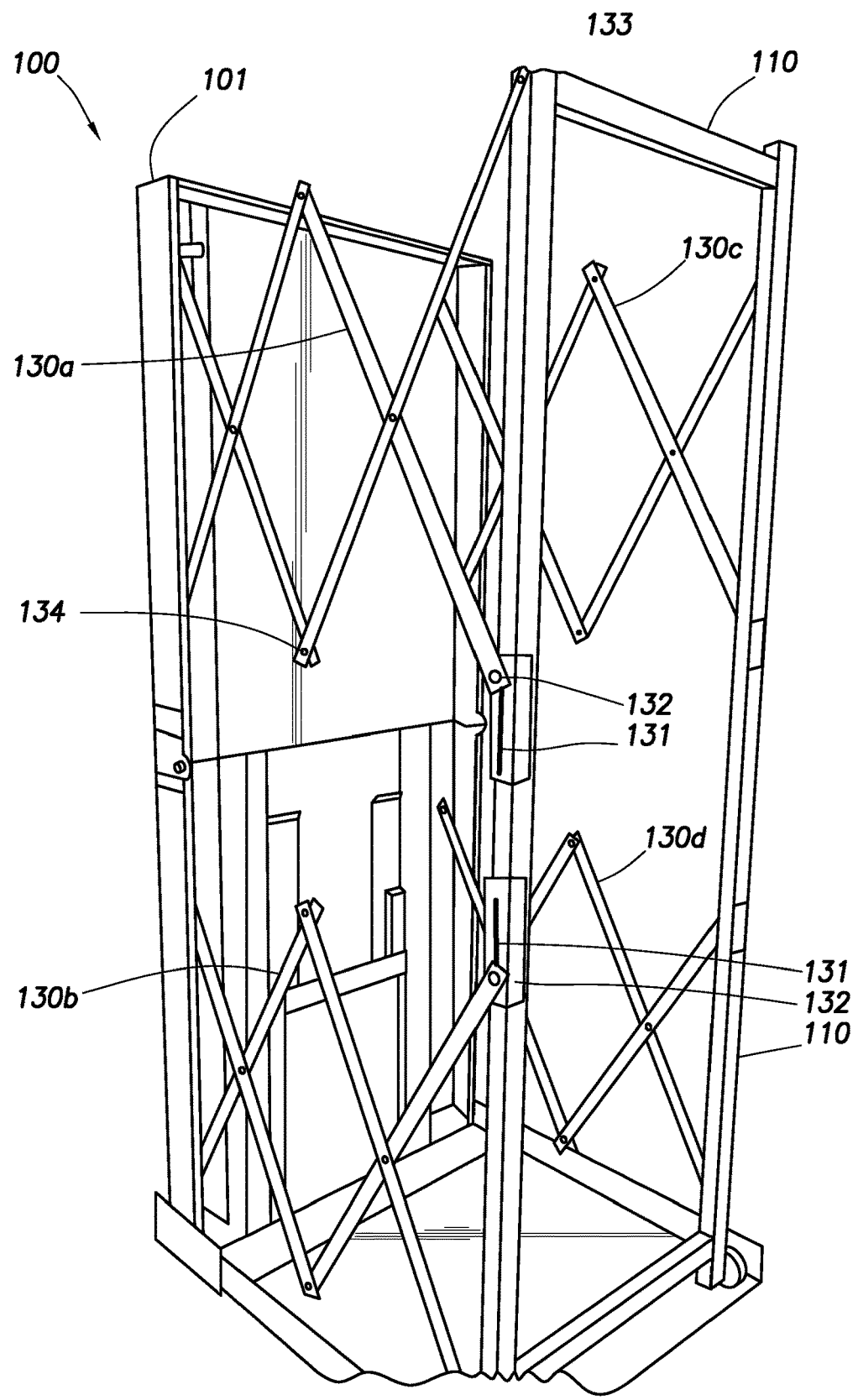
FIG. 3 is a partial side perspective view of the portable toilet facility in a fully expanded position according to certain embodiments.

FIG. 3 shows the portable toilet 100 in a fully opened position. During the partial opening of the portable toilet 100 from FIG. 1 to FIG. 2, the front frame 110 can be opened into a first front frame section 110*a* and a second front frame section 110*b* via the hinge for the front frame 111. In this manner, both the back wall 101 and the front frame 110 are opened via hinges 102/111 into two back wall sections and two front frame sections simultaneously when lifting the first back wall section 101*a*.

The portable toilet 100 also includes at least two side wall frames. Two side wall frames can be used when the back wall 101 and the front frame 110 are not in sections (i.e., sections 101*a*, 101*b*, 110*a*, and 110*b*). The portable toilet 100 can also include a first, second, third, and fourth side wall frame sections 130*a*, 130*b*, 130*c*, and 130*d*. The side wall frames 130 are shown in a retracted position in FIG. 2 and an expanded position in FIG. 3. The side wall frames 130 are converted between the retracted position and the expanded position by moving the front frame 110 away from the back wall 101. Wheels 112 can facilitate movement of the front frame 110 away from the back wall 101. The depth of the side wall frames 130 relative to the back wall 101 is greater in the expanded position compared to the retracted position (for example, as shown when comparing FIG. 3 with FIG. 2).

Figure 4:
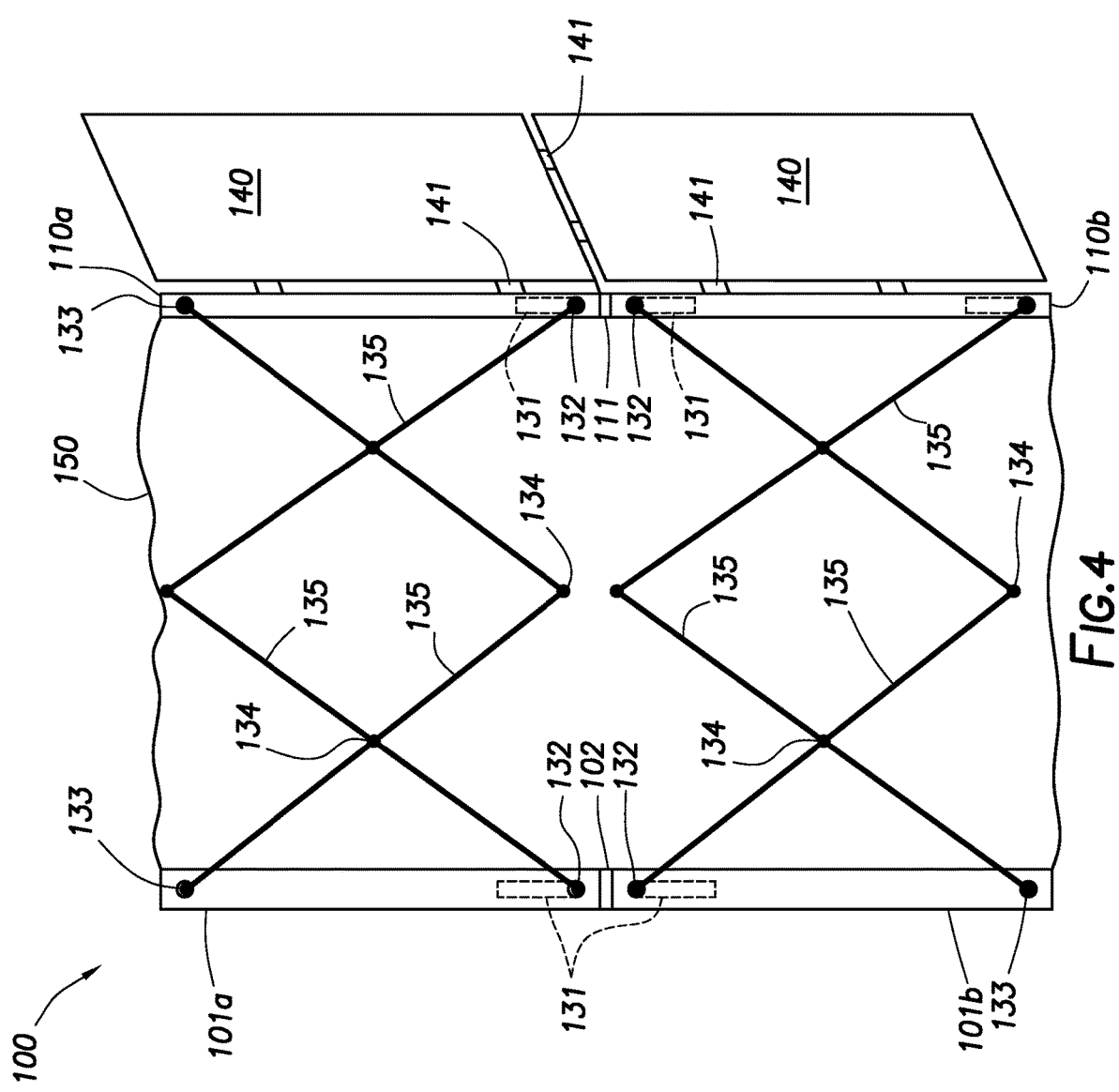
FIG. 4 is a side view of a portable toilet facility according to certain embodiments.

Each of the side wall frames 130 or side wall frame sections 130*a*, 130*b*, 130*c*, and 130*d* can include two or more side wall members 135. For example, as shown in FIGS. 3 and 4, each side wall frame section 130*a*, 130*b*, 130*c*, and 130*d* includes three side wall members 135. The side wall members 135 can have a variety of lengths depending, in part, on the desired depth of the side walls in the expanded position and the total number of side wall members used for each side wall or side wall section. The side wall members 135 can have a thickness in the range from about 0.25 in. (0.64 cm) to about 2 in. (5 cm). The side wall members 135 can be connected to each other at a pivot point 134. The side wall members 135 can circumvolve around the pivot point 134 during conversion from the retracted position and the expanded position. The side wall members 135 can also circumvolve around the pivot point 134 during conversion from the expanded position and the retracted position, for example, when collapsing the portable toilet 100 for storage and/or transportation. In this manner, the side wall members 135 and the pivot points 134 function like scissors during conversion between the retracted and expanded positions or vice versa.

Each side wall frame 130 or each side wall frame section 130*a*, 130*b*, 130*c*, and 130*d* can include at least two rotating connectors 133 connecting a side wall member 135 with the front frame 110 and another side wall member 135 with the back wall 101. As shown in FIG. 4, four support, connecting rods 103 are located at the top and bottom of the back wall 101, and the top and bottom of the front frame 110 and are rotatingly connected to the side wall members 135 at the rotating connectors 133. In this manner, the support, connecting rods 103 rotate as the side wall frames 130 are expanded or retracted. The support, connecting rods 103 also provide stability and uniform expansion and retraction of the side wall frames 130 such that the side wall frames do not become misaligned or skew during expansion and retraction.

The sides of the front frame, the sides of the back wall, and the side wall members can also include a hole for receiving a rotating fastener that is positioned through the aligned holes. The rotating fastener can include a head at one end that has a larger diameter than the diameter of the hole. The head can be positioned on the outside of the front wall side, back wall side, or side wall member. The side wall member can be secured to the front frame and back wall via a securing device positioned on the other end of the rotating fastener. An example of a rotating fastener and securing device can be a bolt and nut. A washer can also be included to aid in rotation of the side wall members. It is to be understood that other fasteners or configurations are possible as long as the side wall members 135 can rotate relative to the back wall 101 and the front frame 110 to retract and expand the side walls during conversion. There can also be three rotating connectors 133 for each side wall frame or each side wall frame section, wherein two rotating connectors attach the side wall frame or side wall frame section with the back wall or front frame and the other rotating connector partially connects the side wall frame or side wall frame section with the front frame or back wall (e.g, two connectors are used for the back wall and one for the front frame or two connectors are used for the front frame and one for the back wall).

Each side wall frame 130 or each side wall frame section 130a, 130b, 130c, and 130d can also include at least two slideable connectors 132 connecting a side wall member 135 with the front frame 110 and another side wall member 135 with the back wall 101. The sides of the front frame 110 and the sides of the back wall 101 can include an expansion track 131. The expansion track 131 can be formed within a portion of the sides of the front frame and the back wall as shown in FIG. 4 or can be a separate component that is attached to the sides of the front frame and back wall as shown in FIG. 3. The slideable connectors 132 can fit into the expansion track 131 such that the slideable connectors move vertically within the expansion track to retract and expand the side walls during conversion. Similar to the rotating connectors 133, the slideable connectors 132 can be a threaded rod. One end of the rod can be attached (e.g., by welding) to the inside of a side wall member 135 or the side wall member can include a hole for placing a bolt or other similar fastener through the hole and expansion track 131. A securing device, such as a nut, can be threaded onto the other end of the threaded rod or the end of the bolt protruding through the void in the expansion track. A washer can also be included to aid in movement of the slideable connectors 132 within the expansion tracks 131. It is to be understood that other fasteners or configurations are possible so long as the side wall members 135 can rotate relative to the back wall 101 and the front frame 110 and move within the expansion track 131 to retract and expand during conversion. It is also to be understood that the locations of the slideable connectors 132 and expansion tracks 131 can be switched with the locations of the rotating connectors 133 as any number of configurations are possible.

The components of the portable toilet 100 can be made of a variety materials. According to certain embodiments, the material is selected to be rigid or semi-rigid. Examples of suitable materials include, but are not limited to, metals, metal alloys, and hard plastics. As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin.

The metal or metal of a metal alloy can be selected from lithium, sodium, potassium, rubidium, cesium, beryllium, calcium, strontium, barium, radium, aluminum, gallium, indium, tin, thallium, lead, bismuth, scandium, titanium, vanadium, chromium, manganese, thorium, iron, cobalt, nickel, copper, zinc, yttrium, zirconium, niobium, molybdenum, ruthenium, rhodium, palladium, praseodymium, silver, cadmium, lanthanum, hafnium, tantalum, tungsten, terbium, rhenium, osmium, iridium, platinum, gold, neodymium, gadolinium, erbium, oxides of any of the foregoing, and any combinations thereof. According to certain embodiments, the metal or metal of a metal alloy is selected from the group consisting of aluminum, tin, nickel, copper, zinc, oxides of any of the foregoing, and any combinations thereof. Preferably, the metal or metal of the metal alloy is selected such that the portable toilet 100 has a lighter weight for ease in transporting and assembly. A metal alloy can also contain a non-metal. The non-metal can be selected from the group consisting of graphite, carbon, silicon, boron nitride, and combinations thereof.

Referring to FIG. 4, after the side wall frames 130 have been converted between the retracted position and an expanded position, a door 140 can be attached to the front frame 110. The door 140 can be made from a variety of materials, including, but not limited to, hard plastics, metals, metal alloys, and fabric surrounding a door frame. Preferably, the material of the door is a lighter-weight material (e.g., aluminum). According to this embodiment, the door 140 can be one piece. According to other embodiments, the door 140 can be attached to the front frame 110 prior to conversion, for example, the portable toilet 100 shown in FIG. 1, wherein the door 140 has a first door section and a second door section connected by one or more hinges for the door 141. In this manner, when the back wall 101 is opened, the front frame 110 and the door 140 are also opened, for example, as shown in FIG. 2, except that the door 140 would be already attached to the front frame 110. According to other embodiments, the door 140 includes a first door section and a second door section that are connected by the hinges for the door 141, whereby the door is not attached to the front frame 110 prior to opening or conversion. As such, the door 140 can be stored and/or transported separately, for example, stacked with the portable toilet 100. After conversion of the side wall frames 130, the door 140 can be opened via the hinges for the door 141, and then the door 140 can be attached to the front frame 110. The hinges for the first door section and the second door section can be a pin-type hinge or a screw hinge. The door 140 can be attached to the front frame 110 via hinges 141 positioned along a side of the door and a corresponding side of the front frame. These hinges can include two metal plates that are attached by a removable pin to secure the door to the front frame. The other side of the door 140 opposite the hinges and the opposite side of the front frame 110 can include: a door knob or lever handle, latch, enge, and optional strike plate used to open and close the door; and/or a locking mechanism to lock the door during occupancy.

As shown in FIG. 4, the portable toilet 100 can also include two side walls 150. The portable toilet 100 can also include a roof (not shown). The side walls 150 and optional roof can be made from a variety of materials, including, but not limited to, hard plastics, a metal, a metal alloy, and fabric. The fabric can be a thick fabric, such as nylon or canvas, without limitation. The side walls 150 can be pre-attached to the back wall 101 and front frame 110 on the inside or outside of the side wall frames 130 prior to opening and/or conversion. According to this embodiment, the side walls 150 are preferably made from a fabric material such that the material can pleat or create a bi-fold when the side wall frames are in the retracted position and the material can un-pleat and be taut or semi-taut when the side wall frames are in the expanded position. If the portable toilet 100 includes a roof, the roof can be made from a fabric material and the top of each side wall can be stitched or sewn with the sides of the roof to prevent water from entering the portable toilet. The roof fabric can also pleat or fold and un-pleat or unfold during conversion like the side wall fabric. A support rod (not shown) for the roof fabric can extend from a top of side wall frames 130*a* and 130*c* parallel to the back wall 101. The support rod can help keep the roof fabric from collapsing or dipping during rain showers or snow. For metal, metal alloys, and hard plastic side walls, the side walls 150 can be attached to the back wall 101 and the front frame 110 on the outside of the side wall frames 130 after conversion of the side wall frames to the expanded position. According to this embodiment, the sides of the back wall 101 and side wall members 135 located closest to the front frame 110 can include openings or holes whereby the side walls 150 can be secured to the portable toilet via fasteners (such as screws or the like) through the openings.

The side walls 150 can include one or more air vents or windows for decreasing the internal temperature of the portable toilet 100. The vents or windows can be located at any location on the side walls, for example, near the bottom, middle, or top. The vents or windows can include a cut out, a window screen, and an optional privacy/rain shield. The privacy/rain shield can be in the form of louvers or a solid covering that can be rolled up and down by hand or with a cord or affixed to the bottom or top of the vent or window by a semi-permanent attachment, such as VELCRO®.

The portable toilet 100 can also include a removable floor (not shown). The floor can be made from a variety of materials, including, but not limited to, fabrics, flexible plastics, and rubbers.

Figure 5:
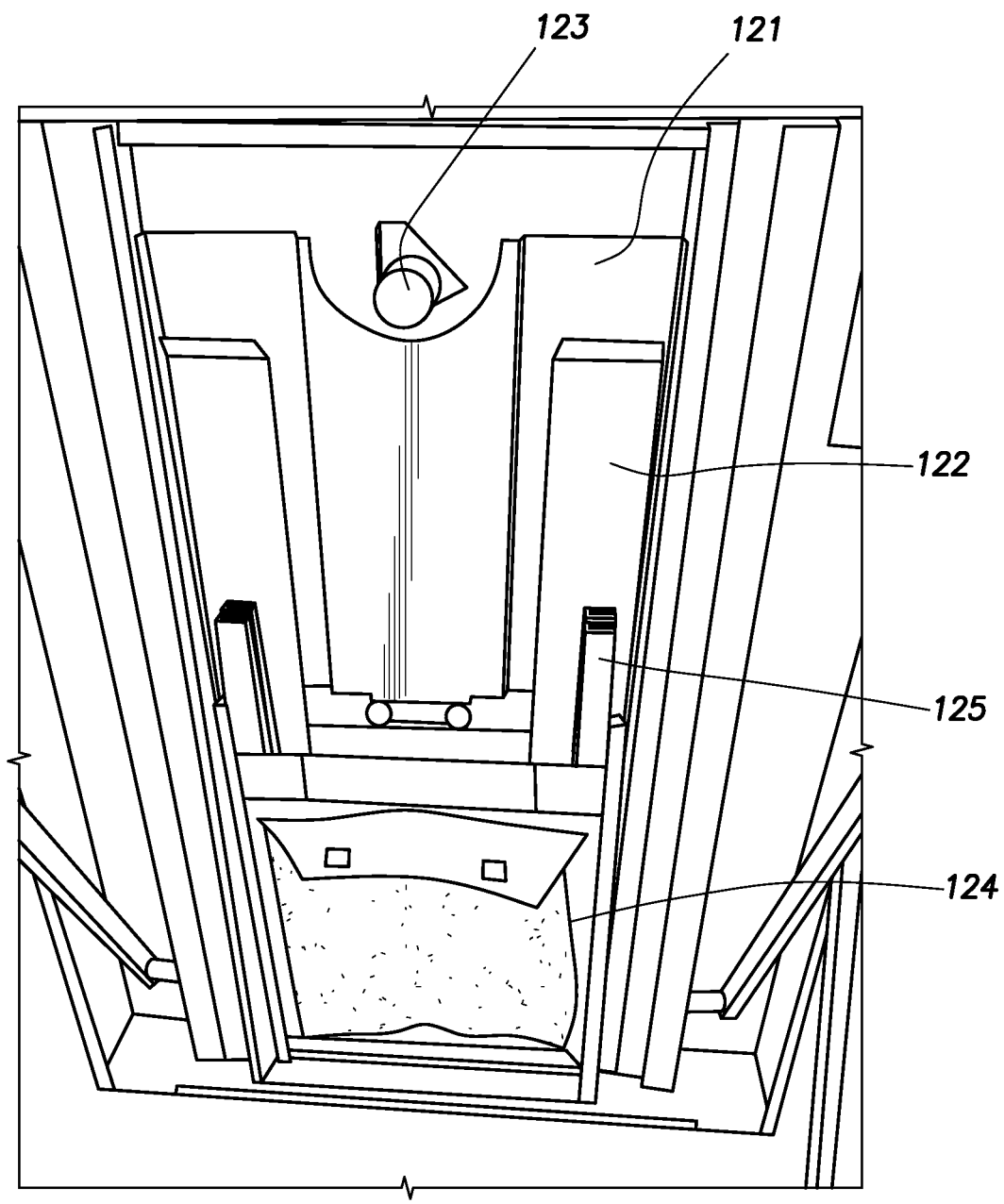
FIG. 5 is a front view of a urinal and toilet according to certain embodiments.

FIG. 5 is a front view of a urinal 121 and a toilet seat 122. A waste receptacle 124 can be connected to a waste receptacle frame 125. The waste receptacle 124 can be one or more bags for collecting waste. The one or more bags can be stacked together in a holder with the holder semi-permanently attached to the back wall 101 or first back wall section 101*a*. Prior to using the toilet, a user can attach the front of a bag to the bottom of the waste receptacle frame 125, for example, by placing the front of the bag over the waste receptacle frame 125 or by other attaching means, such as VELCRO®.

Figure 6:
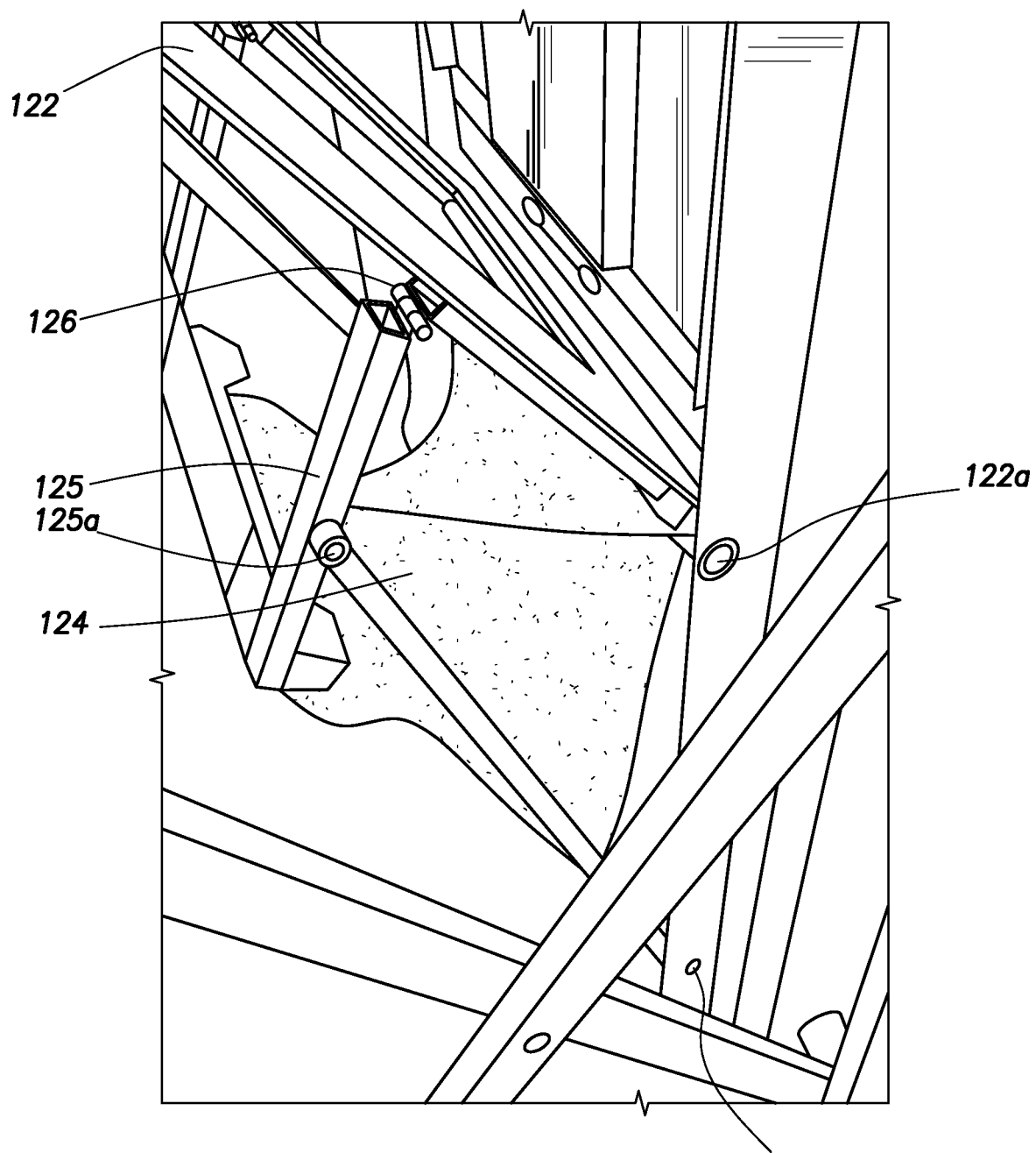
FIG. 6 is a partial side view of the toilet in a partially open position.

FIG. 6 shows the toilet seat 122 in a partially open position. The toilet seat 122 can be lowered by hand or a mechanized device away from the back wall 101 via a toilet seat hinge 122*a*. The hinge 122*a* can be a resistance-type hinge that requires some force for lowering the toilet seat. A hinge 126 for the waste receptacle frame 125 allows the waste receptacle frame to unfold. One or more pivots 125*a* and corresponding support rod can be used to secure the waste receptacle frame 125 to the toilet seat 122 and the back wall 101. As can be seen, the waste receptacle 124 bag is also in a partially open position.

The waste receptacle 124 bags can be made from a semi-rigid material and include a lip on both sides at the top of the bags where a stack of bags can be dropped onto a frame and hang on frame hooks that support the lips. The front of the bags can include one or more openings having a geometric shape and the back of the bags can include one or more openings in the same or different geometric shape having a larger circumference or perimeter compared to the front openings. The one or more openings can be located near the top of the bags between the lips. One or more pegs, having the same geometric shape as the front openings, can be attached to the waste receptacle frame 125. The pegs can have a tapered end that is located closer to the back wall 101 when the toilet seat 122 is not lowered. In this manner, when the toilet seat 122 is lowered, the pegs fit within the openings of the bags, and the front opening fits onto the peg such that when the toilet seat is lowered one bag is opened for use. The used bag can then be lifted from the frame hooks, and properly disposed of. The toilet seat can be raised and ready for the next user to lower the seat and open a new bag for use. According to this embodiment, the bags can have gusset in the sides of the bag such that the bags mostly or wholly fill the opening within the toilet seat when the toilet seat is lowered away from the back wall.

According to certain other embodiments, the waste receptacle 124 bag fits on top of the toilet seat 122. The waste receptacle 124 bag can be fitted on a semi-rigid frame, such as a cardboard frame, that is placed on top of the toilet seat 122 prior to use. The bag material can extend down from the top of the toilet seat 122 to form a U-shaped waste receptacle. The bag material can also be fitted onto the toilet seat without the semi-rigid frame—much like a trash bag can be fitted over the top of a trashcan. When finished, the user can remove the waste receptacle 124 bag or bag and frame from the toilet seat and dispose of the bag or bag and frame in a proper disposal container.

Figure 7:
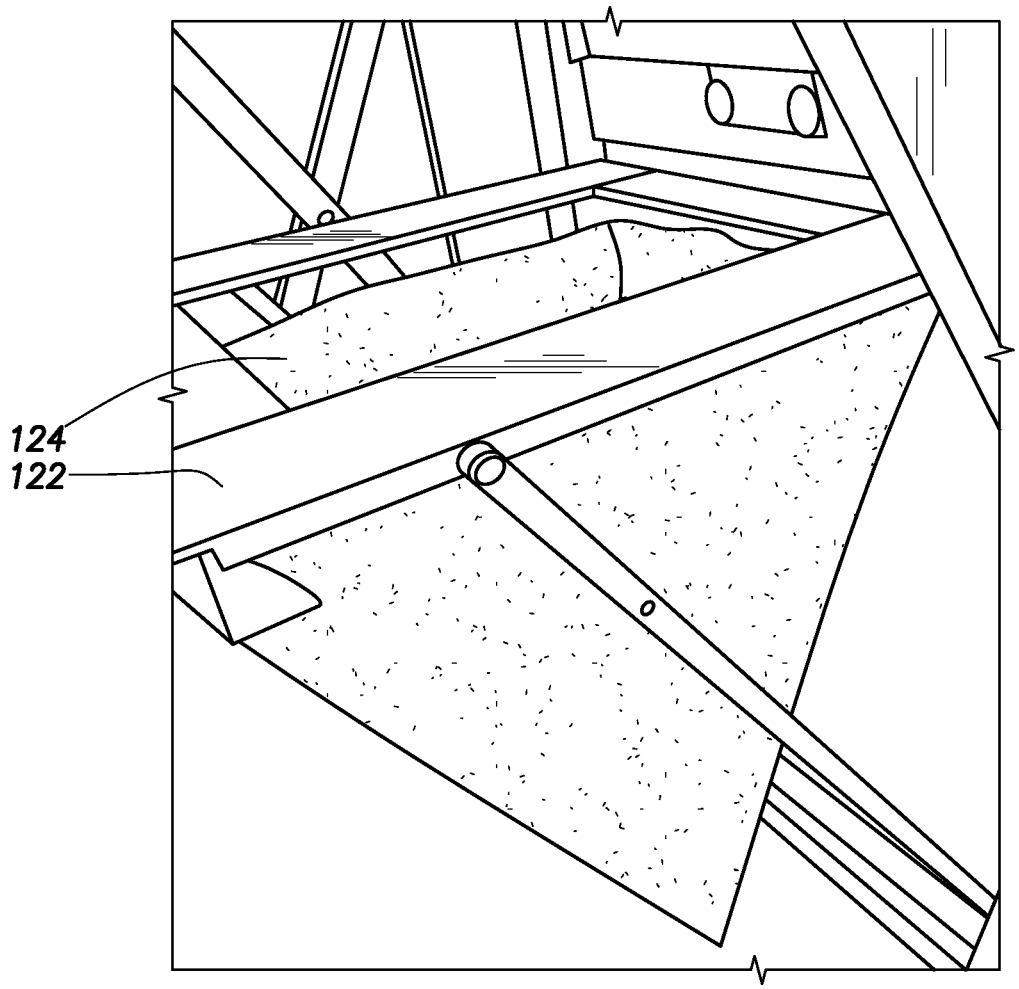
FIG. 7 is a partial side view of the toilet in a fully open position.
Figure 8:
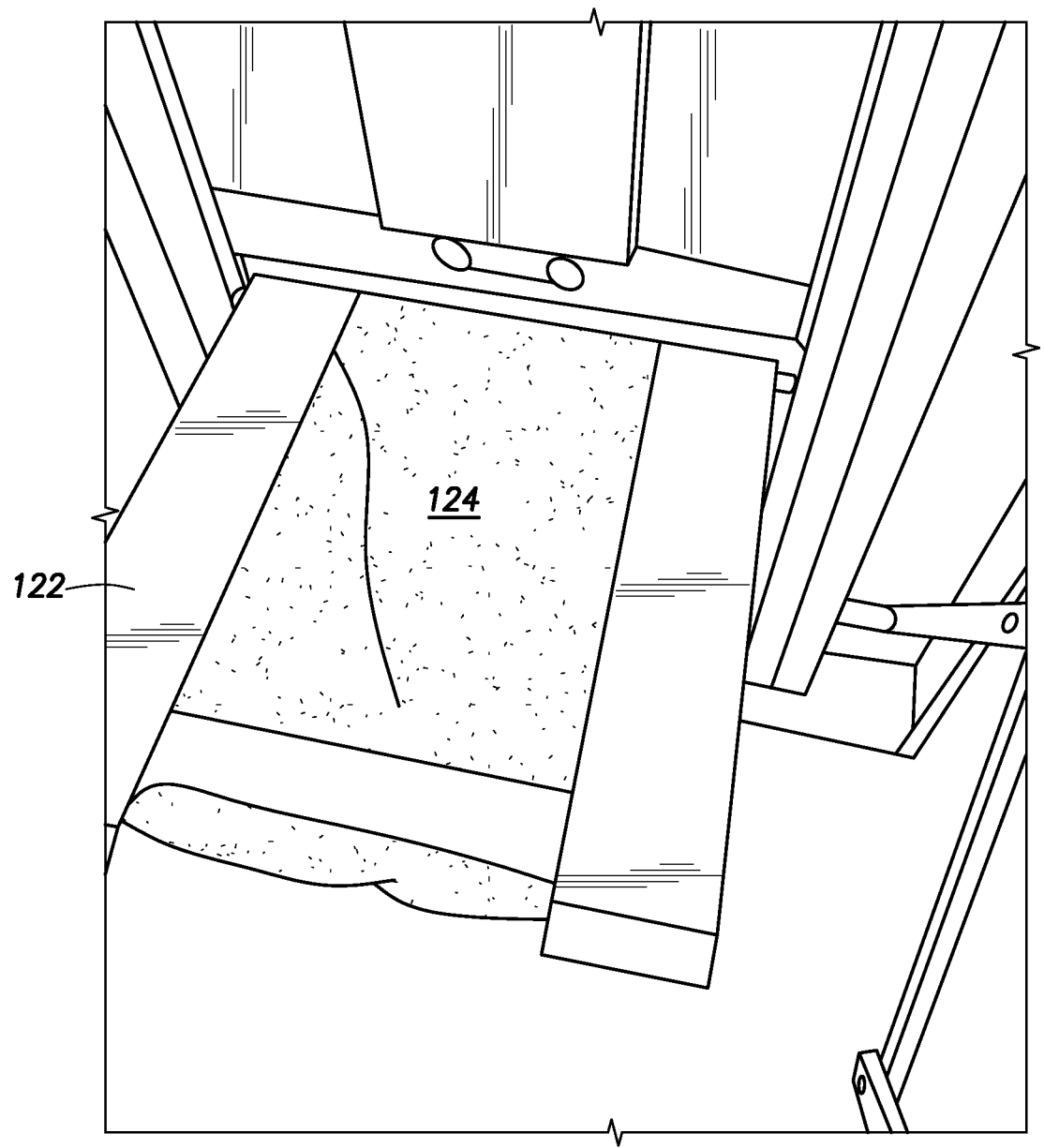
FIG. 8 is a top view of the toilet of FIG. 7.

FIGS. 7 and 8 show the toilet seat 122 and the waste receptacle 124 in a fully open position. A user may now utilize the toilet. After use, the waste receptacle 124 bag can be pulled from the waste receptacle holder, possibly tied at the top opening, and then discarded into a proper trash container.

The waste receptacle 124 bags can be made from a biodegradable material. The waste receptacle bags can also include a deodorizer that is part of the bag material or in the form of a powder, balls, pieces, or pellets contained within the bags. The waste receptacle 124 bags can also include an absorbent material that soaks up liquid waste. The waste receptacle 124 bags can also include a sealing feature at the top opening of the bags such that after waste is located within a bag, the user can remove the bag, seal the bag, and then dispose of the bag in a trash container. A separate waste disposal container can also be provided to house used bags. Heat within the disposal container can break down feces and evaporate the evaporative ingredients in urine such that the waste is able to be safely handled and permanently disposed of or used as fertilizer.

According to certain other embodiments, the toilet seat 122 and waste receptacle 124 include a tube system connected to the toilet seat after the toilet seat is lowered. Accordingly, the toilet seat can be designed to remain in a lowered position after assembly of the portable toilet at a desired location. The tube system can feed into a reservoir that is located inside or outside of the portable toilet. The reservoir can be, for example, a tank. In this manner, a user can enter the portable toilet 100 wherein the toilet seat 122 is already lowered, utilize the toilet, and the waste can flow through the tube system, for example, by gravity, into the reservoir. When full, the reservoir can be disconnected from the tube system and the waste within the reservoir can be disposed of in an appropriate trash receptacle or disposal facility.

Figure 9:
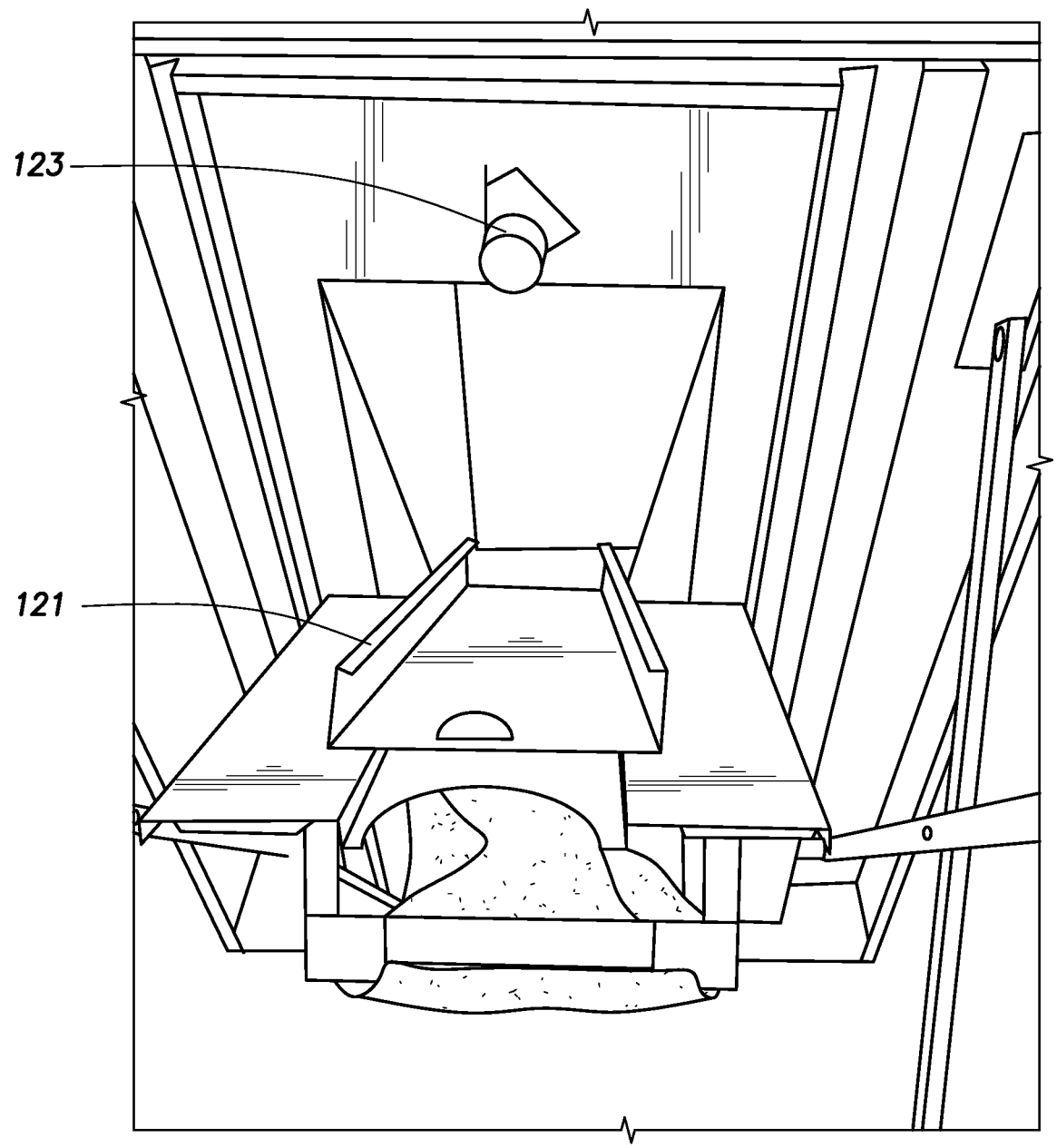
FIG. 9 is a front view of the urinal and toilet in a partially open position.

FIG. 9 shows the urinal 121 in an open position. The urinal 121 can be opened by utilizing a release 123. The release 123 can be a twisting release whereby a user can twist the release to open the urinal or the release can be a push-button release whereby a user can push the button to release the urinal. The urinal 121 can be located closer to the back wall 101 behind the toilet seat 122. The urinal 121 can also be located beside the toilet seat 122 or in a variety of other locations. The urinal 121 can be a trough having a bottom and sides. In this manner, urine can be contained within the urinal.

Figure 10:
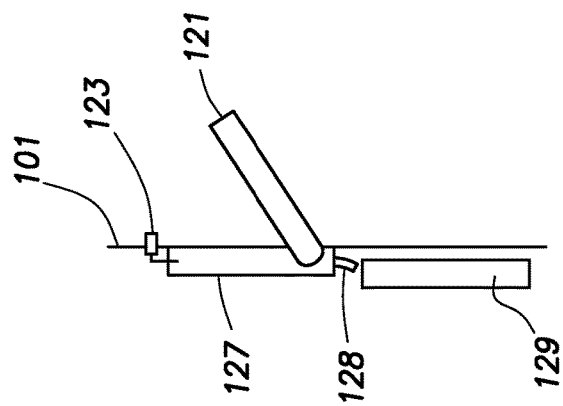
FIG. 10 is a side view of the urinal according to certain other embodiments.

FIG. 10 shows a side view of the urinal 121. As can be seen, a recess 127 can be included in the back wall 101 or second back wall section 101b to wholly or partially house the urinal. Preferably, the recess 127 and the urinal 121 are positioned at a height from the bottom of the back wall 101 or back wall section such that the urinal is user-friendly. Urine from the urinal 121 can flow into a flow tube 128. The flow tube 128 can feed into a urine receptacle 129. The urine receptacle 129 can be a reservoir, which can be the same reservoir as for the toilet seat, a different reservoir, or a reservoir when waste receptacle 124 bags are used for the toilet seat. The urine receptacle 129 can also be a urine evaporation device that contains an absorbent material that can soak up the urine and the evaporative contents of the urine can evaporate such that the absorbent material is capable of soaking up more urine.

The portable toilet 100 can include other fixtures, including, but not limited to, a sink, soap dispenser, a paper towel holder, a mirror, and a trash can. The sink can be a folded down from the back wall 101 or a side wall 150. Some or all of the other fixtures, such as the sink, soap dispenser, paper towel holder, and mirror, can also be temporarily attached to the back wall or side wall by hooks and receiving slots or a receiving bar, or attached by other attachment means, such as VELCRO®.

There can be more than one portable toilet assembled at each location. More than one portable toilet can be useful when the anticipated number of users might require more than one portable toilet.

The preceding discussion is directed to assembly of the portable toilet at a desired location. When the portable toilet is no longer needed at the desired location, the steps can be reversed to disassemble to portable toilet for transporting the portable toilet to another location. For example, the fixtures can be removed or folded up; the urinal and toilet seat can be closed/folded up; the tube system and/or reservoir can be disconnected; non-fabric side walls, roof, and/or floor can be removed; the door can be removed; the side wall frames can be converted from the expanded position to the retracted position; and the unit can then be loaded onto a trailer or a motor vehicle, or the retracted unit can be folded over as shown in FIG. 1 and then loaded onto a trailer or a motor vehicle. The disassembled portable toilet can then be transported to another location or placed in storage until a later time for use.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A collapsible, portable toilet facility comprising:
a back wall;
a front frame;
at least two side wall frames,
wherein the side wall frames are converted between a retracted position and an expanded position,
wherein the depth of the side wall frames relative to the back wall is greater in the expanded position compared to the retracted position,
wherein each side wall frame comprises two or more side wall members connected to each other at a pivot point, and wherein the side wall members circumvolve around the pivot point during conversion from the retracted position and the expanded position; and
at least one of a urinal or a toilet.

2. The toilet facility according to claim 1, wherein the back wall comprises a first back wall section, a second back wall section, and a hinge connecting the first and second back wall sections, wherein the front frame comprises a first front frame section, a second front frame section, and a hinge connecting the first and second front frame sections, wherein the first and second back wall sections and the first and second front frame sections are folded about the hinges when the back wall and front frame are in a collapsed position, and wherein the first and second back wall sections and the first and second front frame sections are unfolded about the hinges when the back wall and front frame are in an open position.

3. The toilet facility according to claim 1, wherein a first side wall frame comprises a first and second side wall frame section; and a second side wall frame comprises a third and fourth side wall frame sections.

4. The toilet facility according to claim 1, wherein the side wall frames are converted between the retracted position and the expanded position by moving the front frame away from the back wall.

5. The toilet facility according to claim 1, wherein each side wall frame comprises at least two rotating connectors, each rotating connector connecting a side wall member with the front frame and another side wall member with the back wall.

6. The toilet facility according to claim 5, further comprising a first and second support, connecting rod located at or near the top and bottom of the back wall, and a third and fourth support, connecting rod located at or near the top and bottom of the front frame, wherein the first, second, third, and fourth support, connecting rods are rotatingly connected to the side wall members at the rotating connectors.

7. The toilet facility according to claim 6, wherein the first, second, third, and fourth support, connecting rods rotate as the side wall frames are converted between the retracted position and the expanded position.

8. The toilet facility according to claim 1, wherein each side wall frame further comprises at least two slideable connectors, each slideable connector connecting a side wall member with the front frame and another side wall member with the back wall.

9. The toilet facility according to claim 8, wherein at least two expansion tracks are located within a portion of sides of the front frame, and at least two expansion tracks are located within a portion of sides of the back wall.

10. The toilet facility according to claim 9, wherein the slideable connectors are located within the expansion tracks such that the slideable connectors move vertically within the expansion tracks to convert the side wall frames between the retracted position and the expanded position.

11. The toilet facility according to claim 1, further comprising a door attached to the front frame.

12. The toilet facility according to claim 1, further comprising two side walls or two side walls and a roof.

13. The toilet facility according to claim 12, wherein the side walls or the side walls and the roof are made from hard plastics, a metal, a metal alloy, or fabric.

14. The toilet facility according to claim 1, wherein the toilet comprises a toilet seat, wherein the toilet seat is connected to the back wall, and wherein the toilet seat is lowered by hand or a mechanized device away from the back wall via a toilet seat hinge prior to use.

15. The toilet facility according to claim 1, further comprising a waste receptacle connected to the toilet.

16. The toilet facility according to claim 15, wherein the waste receptacle comprises one or more bags for collecting waste.

17. The toilet facility according to claim 15, wherein the waste receptacle comprises a tube system connected to a toilet seat of the toilet, and wherein the tube system feeds into a reservoir located inside or outside of the toilet.

18. The toilet facility according to claim 1, wherein urine from the urinal flows through a flow tube into a urine receptacle located inside or outside of the toilet.

19. The toilet facility according to claim 1, further comprising a fixture selected from the group consisting of a window, a window screen, an air vent, a sink, a soap dispenser, a paper towel holder, a mirror, a trash can, and combinations thereof.

20. A collapsible, portable toilet facility comprising:
a back wall;
a front frame;
at least two side wall frames,
    wherein the side wall frames are converted between an expanded position and a retracted position,
    wherein the depth of the side wall frames relative to the back wall is less in the retracted position compared to the expanded position,
    wherein each side wall frame comprises two or more side wall members connected to each other at a pivot point, and wherein the side wall members circumvolve around the pivot point during conversion from the expanded position and the retracted position; and
at least one of a urinal or a toilet.

* * * * *